(12) United States Patent
Sekiguchi et al.

(10) Patent No.: US 11,292,931 B2
(45) Date of Patent: Apr. 5, 2022

(54) INKJET INK, INKJET INK SET, INK STORED CONTAINER, AND INKJET RECORDING METHOD

(71) Applicant: RICOH COMPANY, LTD., Tokyo (JP)

(72) Inventors: Satoyuki Sekiguchi, Kanagawa (JP); Tomohiro Nakagawa, Kanagawa (JP); Toshiyuki Kobashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 130 days.

(21) Appl. No.: 16/355,754

(22) Filed: Mar. 17, 2019

(65) Prior Publication Data

US 2019/0284421 A1 Sep. 19, 2019

(30) Foreign Application Priority Data

Mar. 19, 2018 (JP) .............................. JP2018-051799

(51) Int. Cl.
*C09D 11/40* (2014.01)
*C09D 11/38* (2014.01)
*C09D 11/102* (2014.01)
*B41M 5/00* (2006.01)
*C09D 11/107* (2014.01)

(52) U.S. Cl.
CPC .......... *C09D 11/40* (2013.01); *B41M 5/0023* (2013.01); *B41M 5/0047* (2013.01); *B41M 5/0064* (2013.01); *C09D 11/102* (2013.01); *C09D 11/107* (2013.01); *C09D 11/38* (2013.01)

(58) Field of Classification Search
CPC ...... C09D 11/38; C09D 11/40; B41M 5/0023; B41M 5/0064; B41M 5/0017
See application file for complete search history.

(56) References Cited

U.S. PATENT DOCUMENTS

| 2002/0009659 A1* | 1/2002 | Ebisu | ................. G03G 13/0133 430/45.55 |
| 2007/0122730 A1* | 5/2007 | Sasaki | .................... C08G 63/87 430/109.1 |
| 2015/0116421 A1* | 4/2015 | Nonogaki | ............ C09D 11/326 347/20 |

(Continued)

FOREIGN PATENT DOCUMENTS

| JP | 2008-502790 | 1/2008 |
| JP | 2012-007148 | 1/2012 |

(Continued)

OTHER PUBLICATIONS https://www.lexico.com/synonyms/cure (Year: 2021).*

*Primary Examiner* — John Zimmermann
(74) *Attorney, Agent, or Firm* — Grüneberg and Myers PLLC

(57) ABSTRACT

An inkjet ink comprising a resin and a polyvalent metal ion is provided. The resin contains a resin (1) having a structural unit represented by the following general formula (1):

$$-(CH_2CH_2O)_n-\qquad \text{general formula (1)}$$

where n represents an integer of 5 to 100. A dried film obtained by drying the resin having the structural unit represented by the general formula (1) has a storage modulus of $1.0 \times 10^8$ Pa or lower in a dynamic viscoelasticity measurement at 25 degrees C.

8 Claims, 1 Drawing Sheet

(56) References Cited

U.S. PATENT DOCUMENTS

| | | | |
|---|---|---|---|
| 2016/0168422 A1* | 6/2016 | Iwai | C09D 125/06 428/339 |
| 2016/0251510 A1* | 9/2016 | Furukawa | C08F 279/02 523/201 |
| 2017/0355868 A1 | 12/2017 | Saiga et al. | |
| 2018/0056691 A1* | 3/2018 | Arai | B41M 5/0023 |

FOREIGN PATENT DOCUMENTS

| | | |
|---|---|---|
| JP | 2017-222833 | 12/2017 |
| JP | 2018-001625 | 1/2018 |
| WO | WO2005/123855 A1 | 12/2005 |
| WO | WO2012/132403 A1 | 10/2012 |

\* cited by examiner

INKJET INK, INKJET INK SET, INK STORED CONTAINER, AND INKJET RECORDING METHOD

CROSS-REFERENCE TO RELATED APPLICATIONS

This patent application is based on and claims priority pursuant to 35 U.S.C. § 119(a) to Japanese Patent Application No. 2018-051799, filed on Mar. 19, 2018, in the Japan Patent Office, the entire disclosure of which is hereby incorporated by reference herein.

BACKGROUND

Technical Field

The present disclosure relates to an inkjet ink, an inkjet ink set, an ink stored container, and an inkjet recording method.

Description of the Related Art

Since inkjet printers have advantages of low noise, low running cost, easy color printing and the like, the inkjet printers are widespread as digital signal output apparatuses in general households.

In recent years, not only for household use but also for fields of slow permeation media such as coated paper, non-absorbable media such as plastic films, fabrics such as woven fabrics and knitted fabrics, it has been necessary to acquire images equivalent to the conventional analog printed images by using an inkjet recording method.

For example, in the field of food packaging, so-called soft packaging, small lot/many kind production in the printing job has progressed rapidly, and furthermore, demand for variable printings has increased. Thus, an inkjet recording system responding to soft packaging films made of polyolefin, polyester, polyamide and the like is desired.

Similarly to the soft packaging field, also in the textile printing field, the market scale of so-called Direct to Garment (DTG) field is expanding year by year, where characters are directly printed on clothing such as T-shirts. Additionally, in recent apparel business, personal recommendation business flourishes, and collaboration with fine art in the interior textile field becomes active. From such a tendency, demand for the inkjet recording system capable of forming images excellent in color developing properties and various fastness properties for fabrics is increasing more and more.

Among such inks for coated papers, plastic films and fabrics, aqueous inks are most actively developed from the viewpoints of volatile organic compound (VOC) reduction and safety.

For example, an inkjet recording method has proposed in which an acceptor solution containing a di- or more valent metal salt and a resin composed of a cationic or nonionic resin emulsion is adhered to a recording medium, and then printing is made on the portion adhered with the acceptor solution using an inkjet ink including a pigment surface and/or an anionic resin emulsion surface bonded with a phosphorus-containing group, in attempting to obtain a clear image by inhibiting feathering and color bleed.

As another example, in attempting to obtain a printed textile having high color developing property and little bleeding, an ink set has been proposed which contains a pretreatment liquid containing a polyvalent metal ion and a first polymer fine particle, and an ink containing a second polymer fine particle. Both the first polymer fine particle and the second polymer fine particle comprise a crosslinkable polyurethane and/or a crosslinkable polyurethane-polyurea.

SUMMARY

An embodiment of the present invention provides an inkjet ink comprising a resin and a polyvalent metal ion. The resin contains a resin (1) having a structural unit represented by the following general formula (1):

general formula (1)

where n represents an integer of 5 to 100. A dried film obtained by drying the resin having the structural unit represented by the general formula (1) has a storage modulus of $1.0 \times 10^8$ Pa or lower in a dynamic viscoelasticity measurement at 25 degrees C.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
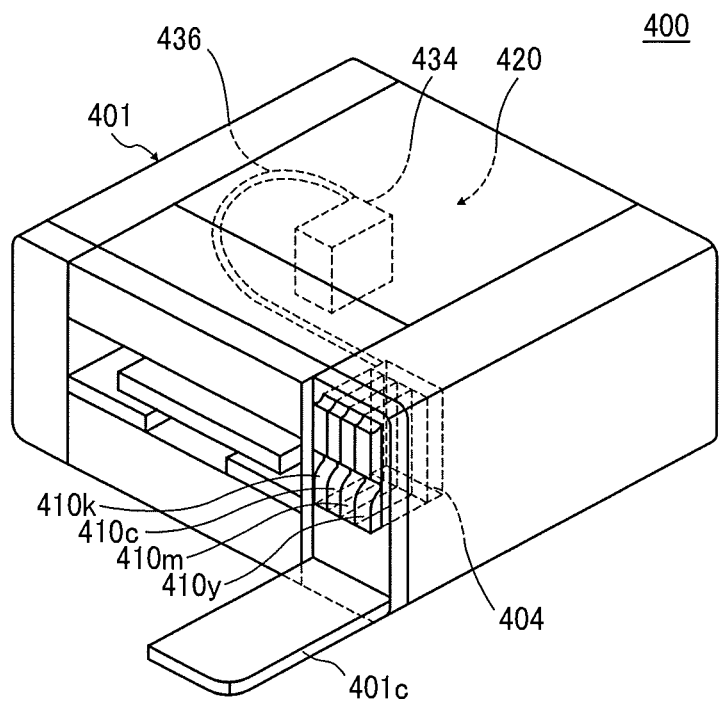
FIG. 1 is a diagram illustrating a recording apparatus using an ink according to an embodiment of the present invention.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Conventional ink jet recording methods and ink sets have had problems in storage stability and discharge stability, e.g. impaired transparency, and insufficient image adhesiveness.

In view of the above circumstances, an object of the present invention is to provide an inkjet ink good in storage stability and discharge stability on coated papers, plastic films and fabrics, and capable of providing images excellent in color developing property, image uniformity, fastness property and adhesiveness.

As will be understood from the following detailed and specific explanation, the present invention can provide an inkjet ink excellent in storage stability and discharge stability on coated papers, plastic films and fabrics, and capable of providing an image having a high color developing property and a high fastness property.

In the aforementioned conventional inkjet recording method, the transparency inherent in the plastic film is impaired and the visibility for the content deteriorates on regions where the pretreatment liquid is applied and the ink is not applied. Since the adhesiveness of the image to the plastic film is insufficient, there are tendencies that images are peeled due to contact with a conveying member in a conveyance route, and delamination occurs after lamination.

With respect to the aforementioned conventional ink, the state of the ink is changed in a short period due to poor storage stability. The ink tends not to be discharged due to poor discharge reliability. Furthermore, in the synthetic fiber media such as polyester for which the demand has been expanding in recent years, the market request levels for the image fastness properties such as friction fastness properties and washing fastness properties have not been achieved.

In the present disclosure, a specific resin is adopted for an inkjet ink. A storage modulus of a dried film obtained by drying the resin measured in a dynamic viscoelasticity measurement at 25 degrees C. is set to $1.0 \times 10^8$ Pa or lower, so that an ink excellent in storage stability and discharge stability can be provided and images high in color developing property and fastness property can be provided on coated papers, plastic films, and fabrics.

The inkjet ink of the present disclosure contains a resin and a polyvalent metal ion, and the resin contains a resin (1) having a structural unit represented by the general formula (1), and a dried film obtained by drying the resin has a storage modulus of $1.0 \times 10^8$ Pa or lower in a dynamic viscoelasticity measurement at 25 degrees C.:

   general formula (1)

where n represents an integer of 5 to 100.

The ink stored container of the present disclosure contains the inkjet ink of the present disclosure. The ink stored container is suitably used for a printer or the like employing an inkjet recording method.

The inkjet recording method of the present disclosure includes the processes of discharging an ink from a nozzle of a recording head and applying the ink onto a recording medium to make a recording, wherein the ink is the above-described inkjet ink or the first and second inks in the above-described ink set. Preferably, the method further includes the process of applying the ink.

(Inkjet Ink (First Ink))

The kind of the resin contained in the inkjet ink (hereinafter, also referred to as the first ink in some cases) of the present disclosure that contains the resin and a polyvalent metal ion is not particularly limited, and can be appropriately selected depending on the intended purpose, as long as the resin contains a resin (1) having the structural unit represented by the general formula (1) and a dried film obtained by drying the resin contained in the ink has a storage modulus of $1.0 \times 10^8$ Pa or lower in a dynamic viscoelasticity measurement at 25 degrees C. Examples of the resin (1) having the structural unit represented by the following general formula (1) include, but are not limited to, an urethane resin, a polyester resin, an acrylic resin, a vinyl acetate-based resin, a styrene-based resin, a butadiene-based resin, a styrene-butadiene-based resin, a vinyl chloride-based resin, an acrylic styrene-based resin, and an acrylic silicone-based resin. Above all, the urethane resin is preferable for fastness property:

   general formula (1)

where n represents an integer of 5 to 100.

A resin particle composed of these resins may be used. In a state of a resin emulsion in which the resin particle is dispersed in water as a dispersion medium, the resin particle can be mixed with a material such as an organic solvent to obtain an ink. As the resin particle, a synthesized resin particle may be appropriately used, or a commercially available product may be used. In addition, these resin particles may be used alone or in combination.

A volume average particle diameter of the resin particle is not particularly limited, and can be appropriately selected depending on the intended purpose. However, the volume average particle diameter is preferably 10 nm to 1,000 nm, more preferably 10 nm to 200 nm, and particularly preferably 10 nm to 100 nm, for good fixity and high image hardness.

The volume average particle diameter can be measured using e.g. a particle size analyzer (Nanotrac Wave-UT151, manufactured by MicrotracBEL Corp.).

The resin contained in the first ink contains the resin (1) having the structural unit represented by the general formula (1) for storage stability and discharge reliability.

In addition, n in the general formula (1) represents an integer of 5 to 100, preferably 10 to 80, more preferably 20 to 70, for storage stability, discharge reliability, fastness property, and adhesiveness.

In the general formula (1), n represents an average number of the repeating units of the general formula (1) contained in the resin (1).

Whether or not a resin has the structural unit represented by the general formula (1) can be analyzed by acquiring a dried film of the resin pretreated similarly to the pretreatment in the G' measurement of storage modulus (G') and analyzing the dried film with 1H-NMR The content of the structural unit represented by the general formula (1) in the resin (1) having the structural unit represented by the general formula (1) is preferably 5% by mass to 60% by mass, and more preferably 10% by mass to 40% by mass, for storage stability and discharge reliability.

The dried film obtained by drying the resin contained in the first ink has a storage modulus of $1.0 \times 10^8$ Pa or lower, and more preferably $6.0 \times 10^7$ Pa or lower, in the dynamic viscoelasticity measurement at 25 degrees C., for fastness property and adhesiveness.

The dried film obtained by drying the resin contained in the first ink has a storage modulus of preferably $3.0 \times 10^8$ Pa or lower, and more preferably $1.0 \times 10^8$ Pa or lower, in the dynamic viscoelasticity measurement at -20 degrees C., for fastness property and adhesiveness.

The storage modulus can be adjusted depending on the monomer composition, the segment chain length, the molecular weight, and the glass transition temperature of the resin, and, in a case of having a crosslinked structure based on tri- or more functional monomers, the concentration of the monomers in the resin, and a proportion of the hydrogen bond-generating component such as an urethane group and an urea group in the resin, and the like.

For example, to adjust the storage modulus within the above range, when the resin is an urethane-based resin, a highly flexible soft segment (aliphatic polyol or the like) may be used to make a content of a diisocyanate component in the resin about 20% by mass to 30% by mass, to be also described in detail in Examples.

The first ink contains a resin and a polyvalent metal ion. The ink does not substantially contain colorants and the like. The dried film of the resin in the first ink is obtained by dialyzing the ink to remove the polyvalent metal ion, the organic solvent, the additives and the like, and drying the ink.

Specifically, the dried film of the resin in the first ink can be obtained by the following process. The first ink is put into a dialysis tube and sealed, then the dialysis tube containing the first ink is immersed in a large excess of ion-exchanged water and preserved for 24 hours, then the ion-exchanged water used for immersion was discarded, and the dialysis tube is immersed in a large excess of newly prepared ion-exchanged water. This procedure is repeated until an electric conductivity of the content in the dialysis tube reaches 1 mS/m or lower. The resulting dialysate is dried in a thermostat at 40 degrees C. for 1 week to obtain the dried film.

The test piece used for the dynamic viscoelasticity measurement of the dried film at 25 degrees C. has sizes of 0.2 mm to 0.5 mm in film thickness, 20 mm in length, and 4.5 mm to 5.5 mm in width. Among the sizes of the test piece, the film thickness can be controlled by adjusting the concentration of resin in the dialysate to be dried.

The dynamic viscoelasticity of the dried film at 25 degrees C. is measured using ARES-G2 with a freezer (manufactured by TA Instruments Inc.). The test piece is set in the apparatus using a torsion clamp as a test piece-fixing jig at 20 degrees C., and then cooled to −70 degrees C. with applying an auto tension of 2 g. Ten minutes after the temperature reaches −70 degrees C., measurements are carried out under the following measurement conditions. From the obtained measurement data, the storage modulus at 25 degrees C. is read.

[Measurement Conditions]
  Measurement mode: temperature sweep
  Range of measurement temperature: −70 degrees C. to 160 degrees C.
  Increase rate: 4 degrees C./min
  Frequency: 1 Hz
  Initial strain: 0.1%
  Auto tension: 2 g The method for introducing the structural unit represented by the general formula (1) into the resin is not particularly limited, and can be appropriately selected according to the intended purpose. Examples of the method include, but are not limited to: a method in which a polyester resin is obtained by polycondensation of an alcohol component containing a polyol having the structural unit represented by the general formula (1) with an acid component containing a dicarboxylic acid; a method in which a component containing a polyol having a structural unit represented by the general formula (1) is reacted with a component containing a diisocyanate to obtain a prepolymer, and then the prepolymer is chain-extended with a polyamine or the like to obtain a urethane resin; and a method in which a radically polymerizable monomer is copolymerized with a compound having a radically polymerizable functional group and the structural unit represented by the general formula (1) to obtain an acrylic resin, a vinyl acetate-based resin, a styrene-based resin, a butadiene-based resin, a styrene-butadiene-based resin, a vinyl chloride-based resin, an acryl-styrene-based resin, an acrylic silicone-based resin, or the like.

Although the compound having the radically polymerizable functional group and the structural unit represented by the general formula (1) can be appropriately selected from known compounds, compounds having no ionic functional group are preferable for storage stability and discharge reliability. Examples of the compound include, but are not limited to, polyethylene glycol (n=5 to 100) monomethacrylate, methoxypolyethylene glycol (n=5 to 100) monomethacrylate, ethoxypolyethylene glycol (n=5 to 100) monomethacrylate, polyethylene glycol (n=5 to 100) monoacrylate, and methoxypolyethylene glycol (n=5 to 100) monoacrylate. Specific examples the compound include, but are not limited to, BLEMMER AME-100 (manufactured by NOF CORPORATION), BLEMMER PME-100 (manufactured by NOF Corporation), BLEMMER PME-200 (manufactured by NOF Corporation), BLEMMER PME-400 (manufactured by NOF Corporation), BLEMMER PME-1000 (manufactured by NOF Corporation), and BLEMMER PME-4000 (manufactured by NOF CORPORATION).

<Urethane Resin>

The urethane resin may have not only a soft segment attributed to a polymer polyol moiety but also a hard segment attributed to a polyamine or a short-chain polyol moiety. The soft segment has a structure of interaction between soft segment moieties, and the hard segment has a structure of interaction between hard segment moieties, so that urethane resin excellent in elasticity and toughness can be formed, and images excellent in fastness property can be obtained.

<Method for Producing Urethane Resin>

The urethane resin can be produced by a conventionally used method, e.g., the following method.

First, in the absence of solvent or in the presence of an organic solvent, a polymer polyol containing a polymer polyol having the structural unit represented by the general formula (1), optionally a short-chain polyol, a polyhydric alcohol having an anionic group, and a polyisocyanate are reacted to produce an isocyanate-terminated urethane prepolymer, or an organic solvent solution of the isocyanate-terminated urethane prepolymer.

Subsequently, the isocyanate-terminated urethane prepolymer, or the organic solvent solution of the isocyanate-terminated urethane prepolymer is added with water, to be dispersed in water, then chain-extended by a reaction with a polyamine, and optionally the organic solvent in the system is removed to obtain the urethane resin.

Examples of the organic solvent include, but are not limited to: a ketone such as acetone and methylethylketone; an ether such as tetrahydrofuran and dioxane; an acetate such as ethyl acetate and butyl acetate; a nitrile such as acetonitrile; an amide such as dimethylformamide, N-methylpyrrolidone, and 1-ethyl-2-pyrrolidone. These may be used alone or in combination.

As the polymer polyol, in addition to the polymer polyol having the structural unit represented by the general formula (1), a known polymer polyol can be appropriately used in combination. Examples of the polymer polyol include, but are not limited to, a polycarbonate-based polymer polyol, a polyether-based polymer polyol, a polyester-based polymer polyol, and a polycaprolactone-based polymer polyol. These may be used alone or in combination.

The polymer polyol has a number average molecular weight of preferably 300 to 5,000, and more preferably 500 to 3,000. When the polymer polyol has a number average molecular weight outside the above range, the fastness property and the adhesiveness may deteriorate.

Examples of the short-chain polyol include, but are not limited to, polyhydric alcohols having 2 to 15 carbon atoms such as ethylene glycol, propylene glycol, 1,4-butanediol, 1,5-pentanediol, neopentyl glycol, 1,6-hexanediol, 1,8-octanediol, 1,4-cyclohexane dimethanol, diethylene glycol, glycerin, and trimethylolpropane.

Examples of the polyisocyanate include, but are not limited to: an aromatic polyisocyanate compound such as 1,3-phenylene diisocyanate, 1,4-phenylene diisocyanate, 2,4-tolylene diisocyanate (TDI), 2,6-tolylene diisocyanate, 4,4'-diphenylmethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4,4',4''-triphenylmethane triisocyanate, m-isocyanatophenylsulfonyl isocyanate, and p-isocyanatophenylsulfonyl isocyanate; an aliphatic polyisocyanate compound such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; and an alicyclic polyisocyanate compound such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate. These may be used alone or in combination.

Above all, the aliphatic polyisocyanate compound and the alicyclic polyisocyanate compound are preferable, the alicyclic polyisocyanate compound is more preferable, and isophorone diisocyanate and 4,4'-dicyclohexylmethane diisocyanate are particularly preferable.

Examples of the polyamine include, but are not limited to, a diamine such as ethylenediamine, 1,2-propanediamine, 1,6-hexamethylenediamine, piperazine, 2,5-dimethylpiperazine, isophoronediamine, 4,4'-dicyclohexylmethanediamine, and 1,4-cyclohexanediamine; a polyamine such as diethylenetriamine, dipropylenetriamine, and triethylenetetramine; a hydrazine such as hydrazine, N,N'-dimethylhydrazine, and 1,6-hexamethylenebis hydrazine; and a dihydrazide such as succinic acid dihydrazide, adipic acid dihydrazide, glutaric acid dihydrazide, sebacic acid dihydrazide, and isophthalic acid dihydrazide.

The urethane resin may have a hydrogen bond, which is one of inherent features, and optionally a chemical crosslink attributed to a covalent bond in the molecular structure. When the urethane resin has the chemical crosslink attributed to the covalent bond, a final image is excellent in solvent resistance, and lamination strength in dry lamination can be improved.

The chemical crosslink may be introduced by using, for example, a tri- or more functional polymer polyol, a short-chain polyol, a polyisocyanate, a polyamine, or the like.

The chemical crosslink may be introduced using these compounds alone or in combination.

Examples of the anionic group include, but are not limited to, a carboxyl group and a sulfonic acid group.

The anionic group can be introduced by using a polyol having an anionic group. Examples of the polyol having the anionic group include, but are not limited to, 2,2-dimethylolpropionic acid, 2,2-dimethylolbutanoic acid, 2,2-dimethylolheptanoic acid, and 2,2-dimethyloloctanoic acid.

Examples of a neutralizer which can be used for neutralizing the anionic group include, but are not limited to: a basic compound, e.g., an organic amine such as ammonia, triethylamine, pyridine, and morpholine, and an alkanolamine such as monoethanolamine; and a water-soluble alkaline inorganic group containing Na, K, Li, or Ca.

A content of the resin (1) having the structural unit represented by the general formula (1) in the first ink is not particularly limited, and can be appropriately selected depending on the intended purpose. However, the content is preferably 1% by mass to 30% by mass, and more preferably 5% by mass to 20% by mass, based on the total amount of the ink for adhesiveness, fastness property, storage stability, and discharge reliability.

The polyvalent metal ion can be appropriately selected from known materials. Examples of the polyvalent metal ion include, but are not limited to, calcium ion, magnesium ion, and aluminum ion. These may be used alone or in combination.

The polyvalent metal ion can be contained in the first ink by dissolving a water-soluble polyvalent metal salt in the first ink.

The polyvalent metal salt can be appropriately selected from known materials. Preferable examples of the polyvalent metal salt include, but are not limited to, a carboxylate (acetic acid, lactic acid, etc.), a sulfate, a nitrate, a chloride, and a thiocyanate. These polyvalent metal salts may be used alone or in combination. Above all, a carboxylate, a sulfate, a nitrate, and a chloride which are excellent in solubility in water and solubility in water-soluble organic solvents are preferable for image quality such as color developing property and bleed resistance, and discharge reliability.

A content of the polyvalent metal ion in the first ink is preferably 30 mmol/L to 700 mmol/L, more preferably 60 mmol/L to 500 mmol/L, and even more preferably 100 mmol/L to 400 mmol/L, for suppression of bleeding and density unevenness, color developing property, fastness property, and adhesiveness.

Preferably, the first ink contains a silicone surfactant for image density and suppression of bleeding and density unevenness.

The silicone surfactant is not particularly limited, and can be appropriately selected depending on the intended purpose. However, a compound represented by the following general formula (2) is preferably used for image density and suppression of bleeding and density unevenness.

general formula (2)

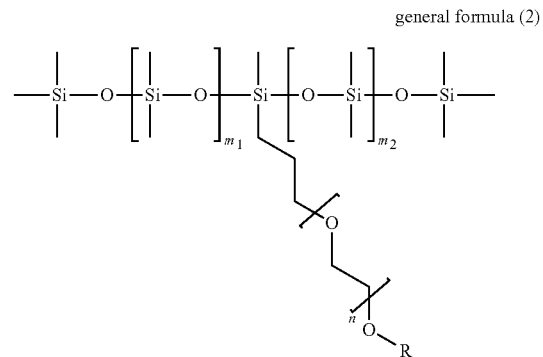

Incidentally, R represents hydrogen atom or a methyl group, m1 and m2 independently represent an integer of 0 to 6, and n represents an integer of 2 to 20.

For storage stability and uniformity of the ink, R in the general formula (2) is preferably hydrogen atom, and for image density, R is preferably a methyl group. More preferably, both the aspects are combined.

Examples of the silicone surfactant include, but are not limited to, BYK-345, 347, 348, and 349 (from BYK Additives & Instruments GmbH), WET 240, 270, and 280 (from Evonik Industries AG), and SAG 002, 013, and 503A (from Nissin Chemical Co., Ltd.).

A content of the silicone surfactant in the ink is not particularly limited, and can be appropriately selected depending on the intended purpose. However, the content is preferably 0.001% by mass to 5% by mass, and more preferably 0.05% by mass to 5% by mass, for excellent wettability and discharge stability, and improved image quality.

(Inkjet Ink Set)

The inkjet ink set of the present disclosure includes the first ink and the second ink containing a colorant. A dried film obtained by drying the second ink has a storage modulus G' of $7.0 \times 10^8$ Pa or lower in the dynamic viscoelasticity measurement at 25 degrees C.

(Second Ink)

The second ink contains a colorant, and the dried film obtained by drying the second ink has a storage modulus G' of preferably $7.0 \times 10^8$ Pa or lower, and more preferably $3.0 \times 10^8$ Pa or lower, in the dynamic viscoelasticity measurement at 25 degrees C., for fastness property and adhesiveness.

Preferably, the second ink contains a polyurethane resin for fastness property and adhesiveness.

The polyurethane resin may be the same as or different from the polyurethane resin contained in the first ink.

The polyurethane resin preferably makes the dried film obtained by drying the second ink have a storage modulus G' of $7.0 \times 10^8$ Pa or lower in the dynamic viscoelasticity measurement at 25 degrees C.

A content of the resin is not particularly limited, and can be appropriately selected depending on the intended purpose. However, the content is preferably 1% by mass to 30% by mass, and more preferably 5% by mass to 20% by mass, based on the total amount of the ink for adhesiveness, fastness property, storage stability, and discharge reliability.

The storage modulus G' of the dried film obtained by drying the second ink measured in the dynamic viscoelasticity measurement at 25 degrees C. can be adjusted depending on the monomer composition, the segment chain length, the molecular weight, and the glass transition temperature of the resin, and, in a case of having a crosslinked structure based on tri- or more functional monomers, depending on the concentration of the monomers in the resin, and a proportion of the hydrogen bond-generating component such as an urethane group and an urea group in the resin, and the like.

Preferably, the second ink contains a silicone surfactant for image density and solid image uniformity.

The silicone surfactant is not particularly limited, and can be appropriately selected depending on the intended purpose. However, preferably, the compound represented by the general formula (2) is used for image density and suppression of bleeding and density unevenness.

A content of the silicone surfactant in the second ink is not particularly limited, and can be appropriately selected depending on the intended purpose. However, the content is preferably 0.001% by mass to 5% by mass, and more preferably 0.05% by mass to 5% by mass, for excellent wettability and discharge stability, and improved image quality.

<Colorant>

The colorant is not particularly limited. For the colorant, a pigment and a dye can be used.

As the pigment, an inorganic pigment or an organic pigment can be used. These may be used alone or in combination. Also, a mixed crystal may be used.

As the pigment, for example, a black pigment, a yellow pigment, a magenta pigment, a cyan pigment, a white pigment, a green pigment, an orange pigment, a glossy color pigment such as gold and silver, and a metallic pigment can be used.

As the inorganic pigment, titanium oxide, iron oxide, calcium carbonate, barium sulfate, aluminum hydroxide, barium yellow, cadmium red, chromium yellow, and additionally, carbon black produced by a known method such as a contact method, a furnace method, and a thermal method can be used.

As the organic pigment, an azo pigment, a polycyclic pigment (e.g., phthalocyanine pigment, perylene pigment, perinone pigment, anthraquinone pigment, quinacridone pigment, dioxazine pigment, indigo pigment, thioindigo pigment, isoindolinone pigment, quinophthalone pigment), a dye chelate (e.g., basic dye type chelate, acidic dye type chelate), a nitro pigment, a nitroso pigment, and an aniline black can be used. Above all, a pigment having a good affinity for the solvent is suitably used. In addition, a resin hollow particle and an inorganic hollow particle can also be used.

Specific examples of the black pigment include, but are not limited to, a carbon black (Color Index (C.I.) Pigment Black 7) such as furnace black, lamp black, acetylene black, and channel black, a metal such as copper, iron (C.I. Pigment Black 11), and titanium oxide, and an organic pigment such as aniline black (C.I. Pigment Black 1).

Furthermore, examples of the colored pigment include, but are not limited to, C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213, C. I. Pigment Orange 5, 13, 16, 17, 36, 43, and 51, C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264, C. I. Pigment Violet 1 (Rhodamine Lake), 3, 5:1, 16, 19, 23, and 38, C. I. Pigment Blue 1, 2, 15 (Phthalocyanine Blue), 15:1, 15:2, 15:3, 15:4 (Phthalocyanine Blue), 16, 17:1, 56, 60, and 63, and C. I. Pigment Green 1, 4, 7, 8, 10, 17, 18, and 36.

The dye is not particularly limited. For the dye, an acidic dye, a direct dye, a reactive dye, and a basic dye may be used alone or in combination.

Examples of the dye include, but are not limited to, C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

A content of the colorant in the ink is preferably 0.1% by mass to 15% by mass, more preferably 1% by mass to 10% by mass, for improved image density, and good fixity and discharge stability.

For obtaining an ink by dispersing the pigment, a method of introducing a hydrophilic functional group into a pigment to obtain a self-dispersible pigment, a method of coating a surface of a pigment with a resin and dispersing the pigment, or a method of dispersing the pigment using a dispersant may be carried out.

Specific examples of the method of introducing a hydrophilic functional group into a pigment to obtain a self-dispersing pigment include, but are not limited to, a method of adding a functional group such as a sulfone group or a carboxyl group to a pigment (e.g., carbon) to allow the pigment to be dispersed in water.

Specific examples of the method of coating a surface of a pigment with a resin and dispersing the pigment include, but are not limited to, a method of encapsulating a pigment in a microcapsule to allow the pigment to be dispersed in water. This pigment can also be called a resin-coated pigment. In this case, all of the pigments blended in the ink are not necessarily coated with the resin, and uncoated pigments and partially-coated pigments may be dispersed in the ink as long as the effect of the present disclosure is not impaired.

Specific examples of the method of dispersing the pigment using a dispersant include, but are not limited to, a method of dispersing the pigment using a known low-molecular type dispersant or polymer type dispersant typified by surfactants.

As the dispersant, e.g., an anionic surfactant, a cationic surfactant, an amphoteric surfactant, or a nonionic surfactant can be used depending on the pigment.

As the dispersant, RT-100 (nonionic surfactant) manufactured by TAKEMOTO OIL & FAT Co., Ltd., and a formalin condensate of sodium β-naphthalinesulfonate can also be suitably used.

These dispersants may be used alone or in combination.

<Pigment Dispersion>

An ink can be obtained by blending materials such as water and an organic solvent with a pigment. Also, a pigment dispersion prepared by mixing a pigment with other components such as water and a dispersant can be blended with materials such as water and an organic solvent to produce an ink.

The pigment dispersion is obtained by mixing and dispersing water, a pigment, a pigment dispersant and optionally other components, and adjusting the particle size of the pigment. It is preferable to use a disperser for dispersion.

The particle diameter of the pigment in the pigment dispersion is not particularly limited. However, the diameter of the highest-frequency particle in terms of the maximum number of particles is preferably 20 nm to 500 nm, more preferably 20 nm to 150 nm, for preferable dispersion stability of the pigment, high discharge stability, and high image quality such as image density. The particle diameter of the pigment can be measured using a particle size analyzer (Nanotrac Wave-UT151, manufactured by MicrotracBEL Corp.).

A content of the pigment in the pigment dispersion is not particularly limited, and can be appropriately selected depending on the intended purpose. However, the content is preferably 0.1% by mass to 50% by mass, and more preferably 0.1% by mass to 30% by mass, for good discharge stability and high image density.

Preferably, the pigment dispersion is optionally filtered to remove coarse particles by a filter, a centrifuge, or the like, and degassed.

The first ink and the second ink may contain an organic solvent, water, and additives.

Hereinafter, the organic solvent, water, and the additives which can be used for the first and second inks will be explained.

<Organic Solvent>

The organic solvent used in the present disclosure is not particularly limited, and a water-soluble organic solvent can be used. Examples of the water-soluble organic solvent include, but are not limited to, a polyhydric alcohol, an ether such as polyhydric alcohol alkyl ether and polyhydric alcohol aryl ether, as well as a nitrogen-containing heterocyclic compound, an amide, an amine, and a sulfur-containing compound.

Specific examples of the water-soluble organic solvent include, but are not limited to, a polyhydric alcohol such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; a polyhydric alcohol aryl ether such as ethylene glycol monophenyl ether and ethylene glycol monobenzyl ether; a nitrogen-containing heterocyclic compound such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; an amide such as formamide, N-methylformamide, N,N-dimethylformamide, 3-methoxy-N,N-dimethylpropionamide, 3-butoxy-N,N-dimethylpropionamide; an amine such as monoethanolamine, diethanolamine, and triethylamine; a sulfur-containing compound such as dimethylsulfoxide, sulfolane, and thiodiethanol; as well as propylene carbonate, and ethylene carbonate.

Preferably, an organic solvent having a boiling point of 250 degrees C. or lower is used, because such an organic solvent functions as a wetting agent and furthermore provides a good drying property.

A polyol compound having 8 or more carbon atoms and a glycol ether compound are also suitably used. Specific examples of the polyol compound having 8 or more carbon atoms include, but are not limited to, 2-ethyl-1,3-hexanediol and 2,2,4-trimethyl-1,3-pentanediol.

Specific examples of the glycol ether compound include, but are not limited to, a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and a polyhydric alcohol aryl ether such as ethylene glycol monophenyl ether and ethylene glycol monobenzyl ether.

A content of the organic solvent in the ink is not particularly limited, and can be appropriately selected depending on the intended purpose. However, the content is preferably 10% by mass to 60% by mass, and more preferably 20% by mass to 60% by mass, for drying property and discharge reliability of the ink.

<Water>

A content of water in the ink is not particularly limited, and can be appropriately selected depending on the intended purpose. However, the content is preferably 10% by mass to 90% by mass, and more preferably 20% by mass to 60% by mass, for drying property and discharge reliability of the ink.

<Additives>

Optionally, a surfactant, an antifoaming agent, an antiseptic and antifungal agent, an antirust agent, a pH conditioner, and the like may be added to the ink.

<Surfactant>

As the surfactant, any of a silicone-based surfactant, a fluorine-based surfactant, an amphoteric surfactant, a nonionic surfactant, and an anionic surfactant can be used.

The silicone-based surfactant is not particularly limited and can be appropriately selected depending on the intended purpose. Above all, a surfactant which does not decompose even at a high pH is preferable, and examples of such a surfactant include, but are not limited to, a side-chain-modified polydimethylsiloxane, a both-end-modified polydimethylsiloxane, a one-end-modified polydimethylsiloxane, and a side-chain-both-end-modified polydimethylsiloxane. A surfactant having a polyoxyethylene group or a polyoxyethylene polyoxypropylene group as a modified group is particularly preferable because of desirable properties as the aqueous surfactant. As the silicone-based surfactant, a polyether-modified silicone-based surfactant can also be used, and is exemplified by a compound in which a polyalkylene oxide structure is introduced into a side chain of an Si moiety of dimethylsiloxane.

As the fluorine-based surfactant, for example, a perfluoroalkyl sulfonic acid compound, a perfluoroalkyl carboxylic acid compound, a perfluoroalkyl phosphate compound, an ethylene oxide-added perfluoroalkyl, and a polyoxyalkylene ether polymer compound having a perfluoroalkyl ether group on the side chain are particularly preferable because of low foamability. Examples of the perfluoroalkyl sulfonic acid compound include, but are not limited to, perfluoroalkyl sulfonic acid and perfluoroalkyl sulfonate. Examples of the perfluoroalkyl carboxylic acid compound include, but are not limited to, perfluoroalkyl carboxylic acid and perfluoroalkyl carboxylate. Examples of the polyoxyalkylene ether polymer compound having a perfluoroalkyl ether group in the side chain include, but are not limited to, a sulfate of the polyoxyalkylene ether polymer having a perfluoroalkyl ether group in the side chain, and a salt of the polyoxyalkylene ether polymer having a perfluoroalkyl ether group in the side chain. Examples of counter ions of the salts in these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Examples of the amphoteric surfactant include, but are not limited to, laurylaminopropionate, lauryl dimethyl betaine, stearyl dimethyl betaine, and lauryl dihydroxyethyl betaine.

Examples of the nonionic surfactant include, but are not limited to, polyoxyethylene alkyl phenyl ether, polyoxyethylene alkyl ester, polyoxyethylene alkyl amine, polyoxyethylene alkyl amide, polyoxyethylene propylene block polymer, sorbitan fatty acid ester, polyoxyethylene sorbitan fatty acid ester, and ethylene oxide-added acetylene alcohol.

Examples of the anionic surfactant include, but are not limited to, polyoxyethylene alkyl ether acetate, dodecylbenzene sulfonate, laurate, and a salt of polyoxyethylene alkyl ether sulfate.

These may be used alone or in combination.

The fluorine-based surfactant is preferably a fluorine-substituted compound having 2 to 16 carbon atoms, and more preferably a fluorine-substituted compound having 4 to 16 carbon atoms.

Examples of the fluorine-based surfactant include, but are not limited to, a perfluoroalkyl phosphate compound, a perfluoroalkyl ethylene oxide adduct, and a polyoxyalkylene ether polymer compound having a perfluoroalkyl ether group in the side chain.

Above all, the polyoxyalkylene ether polymer compound having a perfluoroalkyl ether group in the side chain is preferable because of low foamability, and in particular, fluorine-based surfactants represented by general formula (F-1) or general formula (F-2) are preferable.

$$CF_3CF_2(CF_2CF_2)_m\text{—}CH_2CH_2O(CH_2CH_2O)_n H \quad \text{general formula (F-1)}$$

In the compound represented by the general formula (F-1), m preferably represents an integer of 0 to 10, and n preferably represents an integer of 0 to 40, for imparting water solubility.

$$C_nF_{2n+1}\text{—}CH_2CH(OH)CH_2\text{—}O\text{—}(CH_2CH_2O)_a Y \quad \text{general formula (F-2)}$$

In the compound represented by the general formula (F-2), Y represents H, or $C_mF_{2m+1}$ where m represents an integer of 1 to 6, or $CH_2CH(OH)CH_2\text{—}C_mF_{2m+1}$ where m represents an integer of 4 to 6, or $C_pH_{2p+1}$ where p represents an integer of 1 to 19; n represents an integer of 1 to 6; and a represents an integer of 4 to 14.

For the fluorine-based surfactant, a commercially available product may be used. Examples of the commercially available product include, but are not limited to, SURFLON S-111, S-112, S-113, S-121, S-131, S-132, S-141, and S-145 (manufactured by AGC Inc.); FLUORAD FC-93, FC-95, FC-98, FC-129, FC-135, FC-170C, FC-430, and FC-431 (manufactured by 3M Japan Limited); MEGAFACE F-470, F-1405, and F-474, (manufactured by DIC Corporation); Zonyl TBS, FSP, FSA, FSN-100, FSN, FSO-100, FSO, FS-300, and UR, and Capstone FS-30, FS-31, FS-3100, FS-34, and FS-35 (manufactured by Chemours Company); FT-110, FT-250, FT-251, FT-400S, FT-150, and FT-400SW (manufactured by Neos Corporation); PolyFox PF-136A, PF-156A, PF-151N, PF-154, and PF-159 (manufactured by OMNOVA Solutions Inc.); and UNIDYNE DSN-403N (manufactured by DAIKIN INDUSTRIES, LTD.). Above all, FS-3100, FS-34, and FS-300 manufactured by Chemours Company, FT-110, FT-250, FT-251, FT-400S, FT-150, and FT-400SW manufactured by Neos Corporation, PolyFox PF-151N manufactured by OMNOVA Solutions Inc., and UNIDYNE DSN-403N manufactured by DAIKIN INDUSTRIES, LTD. are particularly preferable for good character printing quality, in particular, remarkably improved color developing property, permeability to paper, wettability, and dyeing levelness.

A content of the surfactant in the ink is not particularly limited, and can be appropriately selected depending on the intended purpose. However, the content is preferably 0.001% by mass to 5% by mass, and more preferably 0.05% by mass to 5% by mass, for excellent wettability and discharge stability, and improved image quality.

<Antifoaming Agent>

The antifoaming agent is not particularly limited. Examples of the antifoaming agent include, but are not limited to, a silicone-based antifoaming agent, a polyether-based antifoaming agent, and a fatty acid ester-based antifoaming agent. These may be used alone or in combination. Above all, the silicone-based antifoaming agent is preferable for excellent foam breaking effect.

<Antiseptic and Antifungal Agent>

The antiseptic and antifungal agent is not particularly limited. Examples of the antiseptic and antifungal agent include, but are not limited to, 1,2-benzisothiazolin-3-one.

<Antirust Agent>

The antirust agent is not particularly limited. Examples of the antirust agent include, but are not limited to, acidic sulfite and sodium thiosulfate.

<pH Conditioner>

The pH conditioner is not particularly limited as long as the pH conditioner can adjust the ink to have a pH of 7 or higher. Examples of the pH conditioner include, but are not limited to, an amine such as diethanolamine and triethanolamine.

The physical properties of the ink are not particularly limited, and can be appropriately selected depending on the intended purpose. For example, viscosity, surface tension, pH, and the like are preferably within the following ranges.

The viscosity of the ink at 25 degrees C. is preferably 5 mPa·s to 30 mPa·s, more preferably 5 mPa·s to 25 mPa·s, for improved character printing density and character quality, and good dischargeability. Herein, the viscosity can be measured using a rotary viscometer (RE-80L manufactured by TOKI SANGYO CO., LTD.). The measurement can be implemented under a measurement condition using a standard cone rotor (1° 34'×R24), with a sample liquid volume of 1.2 mL, at a rotation speed of 50 rpm and 25 degrees C., for 3 minutes.

The surface tension of the ink is preferably 35 mN/m or lower, and more preferably 32 mN/m or lower, at 25 degrees C., for suitably leveling the on the recording medium and shortening the time of drying the ink.

The pH of the ink is preferably 7 to 12, and more preferably 8 to 11, for preventing corrosion of a metal member in contact with the ink.

The particle diameter of the solid content in the ink is not particularly limited, and can be appropriately selected depending on the intended purpose. However, the diameter of the highest-frequency particle in terms of the maximum number of particles is preferably 20 nm to 1,000 nm, and more preferably 20 nm to 150 nm, for improving discharge stability and image quality such as image density. The solid content contains resin particles, pigment particles, and the like. The particle diameter can be measured using a particle size analyzer (Nanotrac Wave-UT151, manufactured by MicrotracBEL Corp.).

<Recording Medium>

The recording medium is not particularly limited. For the recording medium, plain paper, glossy paper, special paper, and cloth can be used. A good image can be formed even using an impermeable substrate.

The impermeable substrate refers to a substrate having a surface with low water permeability and absorbability, including a material which has many cavities inside but does not open to the outside. More quantitatively, such a substrate has a water absorption amount in 30 msec$^{1/2}$ after start of the contact with water of 10 mL/m$^2$ or less in a Bristow method.

As the impermeable substrate, for example, a plastic film such as a vinyl chloride resin film, a polyethylene terephthalate (PET) film, a polypropylene film, a polyethylene film, and a polycarbonate film can be suitably used.

The recording medium is not limited to materials used as general recording mediums. For the recording medium, a building material such as wallpaper, floor material, and tile, a cloth for clothing such as T-shirt, a fabric, and a leather can be appropriately used. Also, ceramics, glass, and metal can be used by adjusting a constitution of a route for conveying the recording medium.

In the present disclosure, the fabric refers to a cloth and a textile made of fibers, such as a knitted fabric, a woven fabric, and a nonwoven fabric.

<Recorded Matter>

The recorded matter of the present disclosure has an image formed using the ink of the present disclosure on the recording medium.

Recording can be carried out by an inkjet recording apparatus and an inkjet recording method to obtain the recorded matter.

<Recording Apparatus and Recording Method>

The ink of the present disclosure can be suitably used for various recording apparatuses employing an inkjet recording method, e.g., a printer, a facsimile machine, a copier, a printer/facsimile/copier multifunction peripheral, and a solid object forming apparatus.

In the present disclosure, the recording apparatus and the recording method refer to an apparatus capable of discharging an ink and various treatment liquids to the recording medium and a method of making a recording using the apparatus, respectively. The recording medium refers to a medium which can be at least temporarily adhered with the ink and the various treatment liquids.

The recording apparatus may include not only a head portion configured to discharge the ink, but also devices associated with feed, conveyance, and ejection of the recording medium, and furthermore a device called a posttreatment device.

The recording apparatus may have a heating device and a drying device respectively used in the heating step and the drying step in the recording method. The heating device and the drying device may include respective devices for heating and drying the character-printed surface and the back surface of the recording medium. The heating device and the drying device are not particularly limited. For the heating device and the drying device, for example, a warm-air heater or an infrared heater can be used. Heating and drying can be carried out before, during, and after character printing.

In addition, the recording apparatus and the recording method are not limited to apparatuses and methods capable of visualizing meaningful images such as characters and graphics using the ink. For example, included are recording apparatuses and recording methods capable of forming a pattern such as a geometric pattern, and fabricating a three-dimensional image.

In addition, the recording apparatus includes both a serial type apparatus configured to move the discharging head and a line type apparatus configured not to move the discharging head, unless otherwise specified.

Furthermore, this recording apparatus includes not only a desktop type recording apparatus but also a wide type recording apparatus capable of printing on an A0 size recording medium, and a continuous sheet printer capable of using a continuous paper wound in a roll form as a recording medium.

Figure 2:
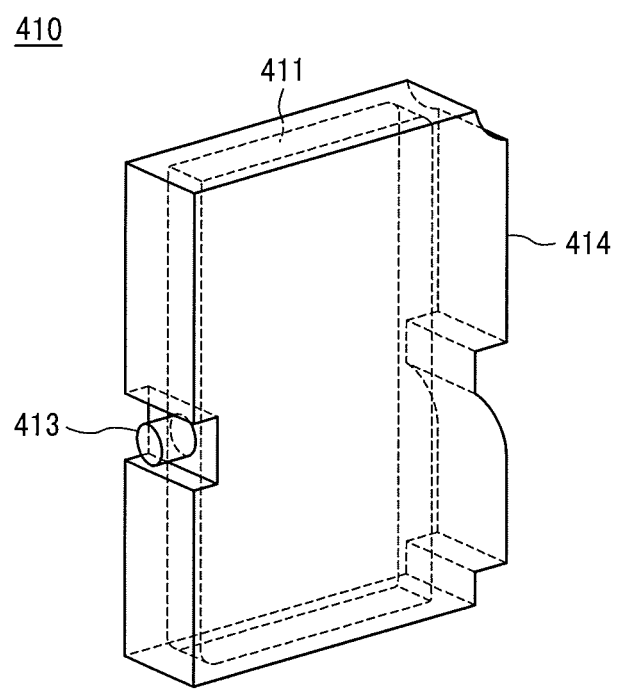
FIG. 2 is a perspective view of a main tank for containing an ink according to an embodiment of the present invention.

An example of the recording apparatus will be described with reference to FIG. 1 or 2. FIG. 1 is an explanatory perspective view of the recording apparatus. FIG. 2 is an explanatory perspective view of a main tank. As an example of the recording apparatus, an image forming apparatus 400 is a serial type image forming apparatus. A mechanism unit 420 is disposed in an exterior 401 of the image forming apparatus 400. Each ink-storing unit 411 in each main tank 410 (410*k*, 410*c*, 410*m*, or 410*y*) for various colors of black (K), cyan (C), magenta (M), and yellow (Y) is formed of a packaging member such as an aluminum laminated film. The ink-storing unit 411 is accommodated in a container case 414 that may be made of plastic. Thereby, the main tank 410 is used as an ink cartridge for each color.

On the other hand, a cartridge holder 404 is disposed on the innermost side of the opening portion configured to appear by opening a cover 401c of the apparatus main body. The main tank 410 is detachably attached to the cartridge holder 404. Thereby, each ink discharging port 413 of the main tank 410 and a discharging head 434 for each color can communicate with each other via a feeding tube 436 for each color, to discharge the inks from the discharging head 434 to the recording medium.

The recording apparatus includes not only a unit configured to discharge the second ink containing a colorant but also a unit configured to discharge the first ink. In an aspect of discharging the first ink, a liquid-storing unit containing the first ink and a liquid discharging head are added, and the first ink is discharged by an inkjet recording method, similarly to the cases of the inks of black (K), cyan (C), magenta (M), and yellow (Y). The step of applying the first ink is preferably carried out before the step of applying the second ink.

The recording apparatus may include not only an ink-discharging unit, but also a device called a posttreatment device. In an aspect for the posttreatment device, a liquid-storing unit containing a posttreatment liquid and a liquid discharging head are added, and the posttreatment liquid is discharged by an inkjet recording method, similarly to the cases of the inks of black (K), cyan (C), magenta (M), yellow (Y).

In the other aspect, a posttreatment device employing a method other than the inkjet recording method, e.g., a blade coating method, a roll coating method, or a spray coating method, may be disposed.

<Posttreatment Liquid>

The posttreatment liquid is not particularly limited as long as the posttreatment liquid can form a transparent layer. The posttreatment liquid is obtained by mixing materials selected from an organic solvent, water, a resin, a surfactant, an antifoaming agent, a pH conditioner, an antiseptic and antifungal agent, an antirust agent, and the like, in accordance with need. In addition, the posttreatment liquid may be applied to the entire recording area formed on the recording medium, or may be applied exclusively to the area where the ink image is formed.

Incidentally, the method of using the ink is not limited to the inkjet recording method, and can be widely used. Examples the method other than the inkjet recording method include, but are not limited to, a blade coating method, a gravure coating method, a bar coating method, a roll coating method, a dip coating method, a curtain coating method, a slide coating method, a die coating method, and a spray coating method.

The application of the ink of the present disclosure is not particularly limited, and can be appropriately selected depending on the intended purpose. For example, the ink can be applied to a printed matter, a paint, a coating material, and a foundation. Also, the ink can be used as not only an ink for forming two-dimensional characters and images but also a solid object forming material for forming three-dimensional objects (solid objects).

As an apparatus for fabricating a solid object, a known apparatus including an ink-storing device, a feeding device, a discharging device, and a drying device can be used, but the apparatus is not limited thereto. The solid objects include a solid object obtained by multi-coating with the ink. Also, included is a processed product obtained by processing a structure in which the ink is applied on a substrate such as a recording medium. The processed product is fabricated by, for example, heat-drawing and punching a recorded matter or a structure having a sheet-like form or film-like form. For example, the processed product is suitably used for applications in which gauges or operation panels of vehicles, office machines, electric and electronic machines, cameras or the like are built after decorating their surfaces.

In the present disclosure, all of the terms "image formation", "recording", "character printing", and "printing" are synonymous with each other.

All of the terms "recording medium", "medium", and "printed matter" are synonyms with each other.

EXAMPLES

The present disclosure will be described by way of the following Examples. However, the present disclosure should not be construed as being limited to these Examples. The unit "parts" refers to "parts by mass".

Pigment Dispersion Preparation Example 1

<Preparation of Black Pigment Dispersion>

The following formulation mixture was premixed, and then cyclically dispersed using a disk type bead mill (KDL type, manufactured by Shinmaru Enterprises Corporation, medium: a zirconia ball having a diameter of 0.3 mm) for 7 hours to obtain a black pigment dispersion (concentration of pigment: 15% by mass).

Carbon black pigment (trade name: Monarch 800, manufactured by Cabot Corporation): 15 parts
    Anionic surfactant (trade name: PIONIN A-51-B, manufactured by TAKEMOTO OIL & Fat Co., Ltd.): 2 parts
    Ion exchanged water: 83 parts

[Production of Resin Particle Dispersion]

Resin particle dispersions 1 to 26 were synthesized according to the following procedure. First, polyols 1 to 3 and a polyisocyanate described in Table 1, and 90 parts of acetone dehydrated with a molecular sieve were put into a 500 mL separable flask equipped with a stirrer, a thermometer, and a reflux tube, and heated to 70 degrees C. in a nitrogen gas stream, to which 200 ppm of stannous 2-ethylhexanoate was added, and reacted at 70 degrees C. for 3 hours to 10 hours while measuring an isocyanate concentration in the system. Subsequently, the temperature in the system was lowered to 40 degrees C., optionally triethylamine was added to the mixture, to which 270 parts of ion exchanged water was added while stirring at 300 rpm, and stirred for 1 hour, to which an extender was added, and stirred for 3 hours to 6 hours. Thereafter, the mixture was cooled to room temperature, the solvent was distilled off in an evaporator, and the solid content was adjusted to 30% with ion exchanged water, to obtain each of resin particle dispersions 1 to 26.

On the other hand, resin particle dispersions 27 to 36 were obtained according to the following procedure.

First, 87.0 parts of ion exchanged water was put into a 300 mL flask equipped with a stirrer, a thermometer, a nitrogen gas-introducing tube, and a reflux tube, and heated to 70 degrees C. in a nitrogen gas stream, and preserved for 2 hours. On the other hand, monomers and a crosslinking agent described in Table 2, 1.5 parts of Aqualon HS-10 (manufactured by DKS Co. Ltd.), and 42.9 parts of ion exchanged water were mixed, and emulsified with a homomixer to prepare an emulsion.

Subsequently, 3.0% of a 10% Aqualon HS-10 aqueous solution and 2.6 parts of a 5% ammonium persulfate aqueous solution were added to the flask, to which the emulsion was continuously dripped for 2.5 hours. In addition, 0.5 part of a 5% ammonium persulfate aqueous solution was added to the mixture at 1-hour intervals, for 3 hours after the onset of the dripping. After completion of the dripping, the mixture was matured at 70 degree C. for 2 hours, then cooled to room temperature, and the pH was adjusted to 7 to 8 with a 28% ammonia water and the solid content was adjusted to 30% with ion exchanged water to obtain each of resin particle dispersions 27 to 36.

TABLE 1

|  | Polyol 1 | | Polyol 2 | | Polyol 3 | | Polyisocyanate | | Triethylamine | Extender | |
| --- | --- | --- | --- | --- | --- | --- | --- | --- | --- | --- | --- |
|  | Type | Parts | Type | Parts | Type | Parts | Type | Parts | Parts | Type | Parts |
| Resin particle dispersion 1 | PEG-300 | 25.0 | PCL 210 | 58.3 | | | IPDI | 53.2 | | 2-methyl-1,5-pentanediamine | 7.3 |
| Resin particle dispersion 2 | PEG-400 | 26.5 | PCL 210 | 61.9 | | | IPDI | 48.2 | | 2-methyl-1,5-pentanediamine | 6.6 |
| Resin particle dispersion 3 | PEG-600 | 28.3 | PCL 210 | 66.0 | | | IPDI | 42.5 | | 2-methyl-1,5-pentanediamine | 5.8 |
| Resin particle dispersion 4 | PEG-1000 | 30.0 | PCL 210 | 70.0 | | | IPDI | 37.5 | | 2-methyl-1,5-pentanediamine | 5.1 |
| Resin particle dispersion 5 | PEG-2000 | 31.1 | PCL 210 | 72.5 | | | IPDI | 32.9 | | 2-methyl-1,5-pentanediamine | 4.5 |
| Resin particle dispersion 6 | PEG-4000N | 31.5 | PCL 210 | 73.5 | | | IPDI | 31.3 | | 2-methyl-1,5-pentanediamine | 4.3 |
| Resin particle dispersion 7 | PEG-2000 | 31.1 | T5651 | 72.6 | | | IPDI | 32.5 | | 2-methyl-1,5-pentanediamine | 4.5 |
| Resin particle dispersion 8 | PEG-2000 | 30.9 | PTMG 1000 | 72.2 | | | IPDI | 33.4 | | 2-methyl-1,5-pentanediamine | 4.6 |
| Resin particle dispersion 9 | PEG-2000 | 30.0 | T5651 | 70.0 | | | Hydrogenated MDI | 37.1 | | 2-methyl-1,5-pentanediamine | 4.3 |
| Resin particle dispersion 10 | PEG-2000 | 33.0 | T5651 | 77.1 | | | HDI | 26.1 | | 2-methyl-1,5-pentanediamine | 4.7 |
| Resin particle dispersion 11 | PEG-2000 | 31.1 | T5651 | 72.6 | | | IPDI | 32.5 | | Diethylenetriamine | 4.0 |
| Resin particle dispersion 12 | PEG-1000 | 6.6 | T5651 | 93.1 | | | IPDI | 36.6 | | 2-methyl-1,5-pentanediamine | 5.0 |
| Resin particle dispersion 13 | PEG-1000 | 12.5 | T5651 | 87.3 | | | IPDI | 36.7 | | 2-methyl-1,5-pentanediamine | 5.0 |
| Resin particle dispersion 14 | PEG-1000 | 43.7 | T5651 | 55.6 | | | IPDI | 36.9 | | 2-methyl-1,5-pentanediamine | 5.1 |
| Resin particle dispersion 15 | PEG-1000 | 45.9 | T5651 | 53.5 | | | IPDI | 37.0 | | 2-methyl-1,5-pentanediamine | 5.1 |
| Resin particle dispersion 16 | PEG-1000 | 53.0 | T5651 | 46.4 | | | IPDI | 37.0 | | 2-methyl-1,5-pentanediamine | 5.1 |
| Resin particle dispersion 17 | PEG-1000 | 55.9 | T5651 | 43.5 | | | IPDI | 37.1 | | 2-methyl-1,5-pentanediamine | 5.1 |
| Resin particle dispersion 18 | PEG-2000 | 26.9 | T5651 | 58.3 | 1,4-BD | 4.5 | IPDI | 45.3 | | Diethylenetriamine | 5.5 |
| Resin particle dispersion 19 | PEG-2000 | 23.7 | T5651 | 47.4 | 1,4-BD | 7.9 | IPDI | 55.0 | | Diethylenetriamine | 6.7 |
| Resin particle dispersion 20 | PEG-2000 | 25.8 | T5650E | 60.2 | | | IPDI | 50.4 | | Diethylenetriamine | 6.1 |
| Resin particle dispersion 21 | | | T5651 | 75.3 | DMPA | 8.4 | IPDI | 51.1 | 6.3 | 2-methyl-1,5-pentanediamine | 7.0 |
| Resin particle dispersion 22 | PEG-200 | 22.4 | PCL 210 | 52.3 | | | IPDI | 61.7 | | 2-methyl-1,5-pentanediamine | 8.5 |
| Resin particle dispersion 23 | PEG-6000S | 32.1 | PCL 210 | 74.8 | | | IPDI | 29.4 | | 2-methyl-1,5-pentanediamine | 4.0 |

TABLE 1-continued

| | Polyol 1 | | Polyol 2 | | Polyol 3 | | Polyisocyanate | | Triethylamine | Extender | |
|---|---|---|---|---|---|---|---|---|---|---|---|
| | Type | Parts | Type | Parts | Type | Parts | Type | Parts | Parts | Type | Parts |
| Resin particle dispersion 24 | | | T5650E | 51.9 | DMPA | 13.0 | Hydrogenated MDI | 68.7 | 9.8 | Diethylenetriamine | 4.0 |
| Resin particle dispersion 25 | | | T5651 | 73.9 | DMPA | 10.1 | Hydrogenated MDI | 50.3 | 7.6 | Diethylenetriamine | 2.9 |
| Resin particle dispersion 26 | | | T5651 | 73.9 | DMPA | 10.1 | Hydrogenated MDI | 50.3 | 7.6 | 2-methyl-1,5-pentanediamine | 2.9 |

The materials in the table refer to the followings.
PEG-200: Polyethylene glycol (manufactured by Sanyo Chemical Industries, Ltd., number average molecular weight: 200)
PEG-300: Polyethylene glycol (manufactured by Sanyo Chemical Industries, Ltd., number average molecular weight: 300)
PEG-400: Polyethylene glycol (manufactured by Sanyo Chemical Industries, Ltd., number average molecular weight: 400)
PEG-600: Polyethylene glycol (manufactured by Sanyo Chemical Industries, Ltd., number average molecular weight: 600)
PEG-1000: Polyethylene glycol (manufactured by Sanyo Chemical Industries, Ltd., number average molecular weight: 1000)
PEG-2000: Polyethylene glycol (manufactured by Sanyo Chemical Industries, Ltd., number average molecular weight: 2000)
PEG-4000N: Polyethylene glycol (manufactured by Sanyo Chemical Industries, Ltd., number average molecular weight: 3100)
PEG-6000S: Polyethylene glycol (manufactured by Sanyo Chemical Industries, Ltd., number average molecular weight: 8300)
PCL 210: Polycaprolactone diol (manufactured by Daicel Corporation)
T5651, T5660E: Polycarbonate diol (manufactured by Asahi Kasei Corporation)
PTMG 1000: Polytetramethylene ether glycol (manufactured by Mitsubishi Chemical Corporation)
1,4-BD: 1,4-butanediol
DMPA: Dimethylolpropionic acid
IPDI: Isophorone diisocyanate
Hydrogenated MDI: Dicyclohexylmethane 4,4'-diisocyanate
HDI: Hexamethylene diisocyanate

TABLE 2

| | Monomer 1 | | Monomer 2 | | Monomer 3 | | Crosslinking agent | |
|---|---|---|---|---|---|---|---|---|
| | Type | Parts | Type | Parts | Type | Parts | Type | Parts |
| Resin particle dispersion 27 | MMA | 27.0 | EHA | 55.0 | PME-400 | 9.5 | VTES | 2.5 |
| Resin particle dispersion 28 | MMA | 27.0 | EHA | 55.0 | PME-1000 | 9.5 | VTES | 2.5 |
| Resin particle dispersion 29 | MMA | 27.0 | EHA | 55.0 | PME-4000 | 9.5 | VTES | 2.5 |
| Resin particle dispersion 30 | MMA | 29.0 | EHA | 60.0 | PME-1000 | 3.5 | VTES | 2.5 |
| Resin particle dispersion 31 | MMA | 30.0 | EHA | 61.0 | PME-1000 | 5.5 | VTES | 2.5 |
| Resin particle dispersion 32 | MMA | 36.0 | EHA | 46.0 | PME-1000 | 9.5 | VTES | 2.5 |
| Resin particle dispersion 33 | MMA | 34.0 | EHA | 44.0 | PME-1000 | 9.5 | VTES | 7.5 |
| Resin particle dispersion 34 | MMA | 45.0 | EHA | 37.0 | PME-1000 | 9.5 | VTES | 2.5 |
| Resin particle dispersion 35 | MMA | 30.0 | EHA | 62.0 | PME-1000 | 0.0 | VTES | 2.5 |
| Resin particle dispersion 36 | MMA | 30.0 | EHA | 62.0 | PME-200 | 9.5 | VTES | 2.5 |

Note that the materials in the table refer to the followings.
MMA: Methyl methacrylate
EHA: 2-ethylhexyl acrylate
PME-200: Methoxypolyethylene glycol methacrylate (manufactured by NOF CORPORATION, n = 4)
PME-400: Methoxypolyethylene glycol methacrylate (manufactured by NOF CORPORATION, n = 9)
PME-1000: Methoxypolyethylene glycol methacrylate (manufactured by NOF CORPORATION, n = 23)
PME-4000: Methoxypolyethylene glycol methacrylate (manufactured by NOF CORPORATION, n = 90)
VTES: Vinyltriethoxysilane The values of n in the structural unit represented by the general formula (1) of the resin particles contained in the obtained resin particle dispersions 1 to 20, 22, and 23 were as follows.

TABLE 3

| | n |
|---|---|
| Resin particle dispersion 1 | 7 |
| Resin particle dispersion 2 | 9 |
| Resin particle dispersion 3 | 14 |
| Resin particle dispersion 4 | 23 |
| Resin particle dispersion 5 | 46 |
| Resin particle dispersion 6 | 69 |
| Resin particle dispersion 7 | 46 |
| Resin particle dispersion 8 | 46 |
| Resin particle dispersion 9 | 46 |
| Resin particle dispersion 10 | 46 |
| Resin particle dispersion 11 | 46 |
| Resin particle dispersion 12 | 46 |
| Resin particle dispersion 13 | 46 |
| Resin particle dispersion 14 | 46 |
| Resin particle dispersion 15 | 46 |
| Resin particle dispersion 16 | 46 |
| Resin particle dispersion 17 | 46 |
| Resin particle dispersion 18 | 46 |

TABLE 3-continued

| | n |
|---|---|
| Resin particle dispersion 19 | 46 |
| Resin particle dispersion 20 | 46 |
| Resin particle dispersion 21 | 46 |
| Resin particle dispersion 22 | 4 |
| Resin particle dispersion 23 | 188 |

Examples I-1 to I-38, Comparative Examples I-1 to I-10

Preparation of the First Ink

Materials were mixed according to the formulation shown in Table 4, and stirred for 1 hour, and then pressure-filtered through a 1.2 µm cellulose acetate membrane filter to obtain the first inks 1 to 48. Ion exchanged water was added to the ink so that the total amount was 100 parts.

TABLE 4-1

| | First ink | Solvent 1 | | Solvent 2 | | Surfactant 1 | | Surfactant 2 | | Antifoaming agent | | Antiseptic and antifungal agent | | Metal salt | | Resin | | Ion exchanged water |
|---|---|---|---|---|---|---|---|---|---|---|---|---|---|---|---|---|---|---|
| | | Type | Parts | Type | Parts | Type | Parts | Type | Parts | Type | Parts | Type | Parts | Type | Parts | Type | Parts | Parts |
| Example 1-1 | First ink 1 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 1 | 33 | Remainder |
| Example 1-2 | First ink 2 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 2 | 33 | Remainder |
| Example 1-3 | First ink 3 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 3 | 33 | Remainder |
| Example 1-4 | First ink 4 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 4 | 33 | Remainder |
| Example 1-5 | First ink 5 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 5 | 33 | Remainder |
| Example 1-6 | First ink 6 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 6 | 33 | Remainder |
| Example 1-7 | First ink 7 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 7 | 33 | Remainder |
| Example 1-8 | First ink 8 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 8 | 33 | Remainder |
| Example 1-9 | First ink 9 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 9 | 33 | Remainder |
| Example 1-10 | First ink 10 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 10 | 33 | Remainder |
| Example 1-11 | First ink 11 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 11 | 33 | Remainder |
| Example 1-12 | First ink 12 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 12 | 33 | Remainder |
| Example 1-13 | First ink 13 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 13 | 33 | Remainder |
| Example 1-14 | First ink 14 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 14 | 33 | Remainder |
| Example 1-15 | First ink 15 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 15 | 33 | Remainder |
| Example 1-16 | First ink 16 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 16 | 33 | Remainder |
| Example 1-17 | First ink 17 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 17 | 33 | Remainder |
| Example 1-18 | First ink 18 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 18 | 33 | Remainder |
| Example 1-19 | First ink 19 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 27 | 33 | Remainder |
| Example 1-20 | First ink 20 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 28 | 33 | Remainder |
| Example 1-21 | First ink 21 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 29 | 33 | Remainder |
| Example 1-22 | First ink 22 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 30 | 33 | Remainder |

TABLE 4-1-continued

| | First ink | Solvent 1 | | Solvent 2 | | Surfactant 1 | | Surfactant 2 | | Antifoaming agent | | Antiseptic and antifungal agent | | Metal salt | | Resin | | Ion exchanged water |
|---|---|---|---|---|---|---|---|---|---|---|---|---|---|---|---|---|---|---|
| | | Type | Parts | Type | Parts | Type | Parts | Type | Parts | Type | Parts | Type | Parts | Type | Parts | Type | Parts | Parts Remainder |
| Example 1-23 | First ink 23 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 31 | 33 | Remainder |
| Example 1-24 | First ink 24 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 4 | Resin particle dispersion 32 | 33 | Remainder |
| Example 1-25 | First ink 25 | Propyleneglycol | 20 | SOLFIT MMB | 10 | Wet 270 | 1 | | | AD01 | 0.5 | Proxel LV | 0.3 | MgCl$_2$·6H$_2$O | 4 | Resin particle dispersion 5 | 33 | Remainder |
| Example 1-26 | First ink 26 | Propyleneglycol | 20 | SOLFIT MMB | 10 | | | BYK348 | 0.5 | AD01 | 0.5 | Proxel LV | 0.3 | MgCl$_2$·6H$_2$O | 4 | Resin particle dispersion 5 | 33 | Remainder |
| Example 1-27 | First ink 27 | Propyleneglycol | 20 | SOLFIT MMB | 10 | SURFYNOL 420 | 1 | | | AD01 | 0.5 | Proxel LV | 0.3 | MgCl$_2$·6H$_2$O | 4 | Resin particle dispersion 5 | 33 | Remainder |
| Example 1-28 | First ink 28 | Propyleneglycol | 20 | SOLFIT MMB | 10 | Wet 270 | 1 | BYK348 | 0.5 | AD01 | 0.5 | Proxel LV | 0.3 | Ca acetate·H$_2$O | 4 | Resin particle dispersion 5 | 33 | Remainder |
| Example 1-29 | First ink 29 | Propyleneglycol | 20 | SOLFIT MMB | 10 | Wet 270 | 1 | BYK348 | 0.5 | AD01 | 0.5 | Proxel LV | 0.3 | Ca lactate·5H$_2$O | 4 | Resin particle dispersion 5 | 33 | Remainder |
| Example 1-30 | First ink 30 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 0.5 | Resin particle dispersion 5 | 33 | Remainder |
| Example 1-31 | First ink 31 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 1 | Resin particle dispersion 5 | 33 | Remainder |
| Example 1-32 | First ink 32 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 1.5 | Resin particle dispersion 5 | 33 | Remainder |
| Example 1-33 | First ink 33 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 2.5 | Resin particle dispersion 5 | 33 | Remainder |
| Example 1-34 | First ink 34 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 8 | Resin particle dispersion 5 | 33 | Remainder |
| Example 1-35 | First ink 35 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 9 | Resin particle dispersion 5 | 33 | Remainder |
| Example 1-36 | First ink 36 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 11 | Resin particle dispersion 5 | 33 | Remainder |
| Example 1-37 | First ink 37 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 13 | Resin particle dispersion 5 | 33 | Remainder |
| Example 1-38 | First ink 38 | Propyleneglycol | 20 | SOLFIT MMB | 10 | Wet 270 | 1 | BYK348 | 0.5 | AD01 | 0.5 | Proxel LV | 0.3 | MgCl$_2$·6H$_2$O | 15 | Resin particle dispersion 5 | 33 | Remainder |

TABLE 4-2

| Antifoaming agent | | Antiseptic and antifungal agent | | Metal salt | | Resin | | Ion exchanged water |
|---|---|---|---|---|---|---|---|---|
| Type | Parts | Type | Parts | Type | Parts | Type | Parts | Parts |
| AD01 | 0.5 | Proxel LV | 0.3 | | | Resin particle dispersion 5 | 33 | Remainder |
| AD01 | 0.5 | Proxel LV | 0.3 | $MgCl_2 \cdot 6H_2O$ | 4 | Resin particle dispersion 19 | 33 | Remainder |
| AD01 | 0.5 | Proxel LV | 0.3 | $MgCl_2 \cdot 6H_2O$ | 4 | Resin particle dispersion 20 | 33 | Remainder |
| AD01 | 0.5 | Proxel LV | 0.3 | $MgCl_2 \cdot 6H_2O$ | 4 | Resin particle dispersion 21 | 33 | Remainder |
| AD01 | 0.5 | Proxel LV | 0.3 | $MgCl_2 \cdot 6H_2O$ | 4 | Resin particle dispersion 22 | 33 | Remainder |
| AD01 | 0.5 | Proxel LV | 0.3 | $MgCl_2 \cdot 6H_2O$ | 4 | Resin particle dispersion 23 | 33 | Remainder |
| AD01 | 0.5 | Proxel LV | 0.3 | $MgCl_2 \cdot 6H_2O$ | 4 | Resin particle dispersion 33 | 33 | Remainder |
| AD01 | 0.5 | Proxel LV | 0.3 | $MgCl_2 \cdot 6H_2O$ | 4 | Resin particle dispersion 34 | 33 | Remainder |
| AD01 | 0.5 | Proxel LV | 0.3 | $MgCl_2 \cdot 6H_2O$ | 4 | Resin particle dispersion 35 | 33 | Remainder |
| AD01 | 0.5 | Proxel LV | 0.3 | $MgCl_2 \cdot 6H_2O$ | 4 | Resin particle dispersion 36 | 33 | Remainder |

Note that the materials in the table refer to the followings.
SOLFIT MMB: 3-methoxy-3-methyl-1-butanol (manufactured by KURARAY CO., LTD.)
Wet 270: Silicone surfactant (manufactured by Evonik Industries AG)
SURFYNOL 420: Acetylene glycol surfactant (manufactured by Nissin Chemical Co., ltd.)
BYK 348: Silicone surfactant (manufactured by BYK Additives & Instruments GmbH)
AD01: Envirogem AD01 (manufactured by Air Products and Chemicals, Inc.)
Proxel LV: Benzisothiazolin-3-one solution (manufactured by Lonza Japan)

Preparation of the Second Ink

Materials were mixed according to the formulation shown in Table 5, and stirred for 1 hour, and then pressure-filtered through a 1.2 μm cellulose acetate membrane filter to obtain the second inks 1 to 7. Ion exchanged water was added to the ink so that the total amount was 100 parts.

TABLE 5

| Surfactant 1 | | Surfactant 2 | | Antifoaming agent | | Antiseptic and antifungal agent | | Pigment | | Resin | | Ion exchanged water |
|---|---|---|---|---|---|---|---|---|---|---|---|---|
| Type | Parts | Type | Parts | Type | Parts | Type | Parts | Type | Parts | Type | Parts | Parts |
| Wet-270 | 0.5 | BYK348 | 0.5 | AD01 | 0.3 | Proxel LV | 0.3 | Black pigment dispersion | 33 | Resin particle dispersion 24 | 27 | Remainder |
| Wet-270 | 0.5 | BYK348 | 0.5 | AD01 | 0.3 | Proxel LV | 0.3 | Black pigment dispersion | 33 | Resin particle dispersion 25 | 27 | Remainder |
| Wet-270 | 0.5 | BYK348 | 0.5 | AD01 | 0.3 | Proxel LV | 0.3 | Black pigment dispersion | 33 | Resin particle dispersion 26 | 27 | Remainder |
| Wet-270 | 0.5 | BYK348 | 0.5 | AD01 | 0.3 | Proxel LV | 0.3 | Black pigment dispersion | 33 | Resin particle dispersion 35 | 27 | Remainder |
| Wet-270 | 1 | | | AD01 | 0.3 | Proxel LV | 0.3 | Black pigment dispersion | 33 | Resin particle dispersion 25 | 27 | Remainder |
| | | BYK348 | 0.5 | AD01 | 0.3 | Proxel LV | 0.3 | Black pigment dispersion | 33 | Resin particle dispersion 25 | 27 | Remainder |
| SURFYNOL 420 | 1 | | | AD01 | 0.3 | Proxel LV | 0.3 | Black pigment dispersion | 33 | Resin particle dispersion 25 | 27 | Remainder |

<Measurement of G' of Resin Dried Film of the First Ink>

The G' of the dried film of the resin in the first ink was measured according to the following method. First, the first ink was put into a Visking tube (pore size: 50 Å, cut-off molecular weight: 12,000 to 14,000) and sealed, then the Visking tube containing the first ink was immersed in a large excess of ion-exchanged water and preserved for 24 hours, then the ion-exchanged water used for immersion was discarded, and the Visking tube was immersed in a large excess of newly prepared ion-exchanged water. This procedure was repeated until an electric conductivity of the contents in the Visking tube reached 1 mS/m or lower. The resulting content was dried in a thermostat at 40 degrees C. for 1 week to obtain a dried film of the resin in the first ink.

The dried film was cut out into a piece having a length of 20 mm and a width of 5.0 mm. Incidentally, the amount of the contents to be dried after the dialysis was adjusted so that the film thickness was within a range of 0.2 mm to 0.4 mm.

The G' of the dried film at 25 degrees C. was measured using ARES-G2 equipped with a freezer (manufactured by TA Instruments Inc.). The test piece was set in the apparatus at 20 degrees C. using a torsion clamp as a test piece-fixing jig, and then cooled to −70 degrees C. with applying an auto tension of 2 g. 10 minutes after the temperature reached −70 degrees C., measurements were carried out under the following measurement conditions. From the obtained measurement data, the G' at 25 degrees C. and −20 degrees C. was read.

[Measurement Conditions]

Measurement mode: temperature sweep

Range of measurement temperature: −70 degrees C. to 160 degrees C.

Increase rate: 4 degrees C./min

Frequency: 1 Hz

Initial strain: 0.1%

Auto tension: 2 g

<Measurement of G' of Dried Film of the Second Ink>

The G' of the dried film of the resin in the second ink was measured according to the following method. First, the second ink was dried in a thermostatic at 40 degrees C. for 10 hours, then dried at 150 degrees C. for 24 hours, and furthermore dried under reduced pressure at 150 degrees C. and 10 mmHg or lower for 3 hours to obtain a dried film of the second ink. For the resulting dried film, the G' was measured in the same manner as the measurement for the G' of the dried film of the resin in the first ink.

<Storage Stability>

5 g of the first ink was put into LABORAN screw tube bottle No. 3 (manufactured by AS ONE Corporation), which was stored in a thermostat set at 70 degrees C. for one week, and a rate of the viscosity change was calculated from the viscosities of the ink before and after the storage to evaluate the ink according to the following criteria.

Rate of viscosity change=100×(viscosity after one week−initial viscosity)/initial viscosity [%]

Good: Rate of viscosity change was less than ±10%
Medium: Rate of viscosity change was ±10% or more and less than ±30%.
Good: Rate of viscosity change was ±30% or more

[Discharge Reliability Evaluation]

The first ink was put into an inkjet printer (apparatus name: IPSiO GXe 5500 remodeled machine, manufactured by Ricoh Co., Ltd.), and the dischargeability after decapping was evaluated. First, head cleaning was implemented from a maintenance command of the printer in an environment of 25 degrees C. and 20% RH, and a test chart was printed out to confirm that all channels of nozzles were ready to discharge inks. Subsequently, the printer was left for 10 minutes while the head cap was removed, then head cleaning was implemented once from the maintenance command of the printer, and the test chart was printed again. From the test charts before and after the leaving, the number of non-discharging channels was counted to evaluate the discharge reliability according to the following criteria.

[Evaluation Criteria]

Good: Number of the non-discharging channels was less than 3
Medium: Number of the non-discharging channels was 3 or more and less than 10.
Bad: Number of the non-discharging channels was 10 or more

TABLE 6-1

|  | First ink | G'(25° C.) × $10^7$ Pa | G'(25° C.) × $10^8$ Pa | Storage stability | Discharge reliability |
|---|---|---|---|---|---|
| Example I-1 | First ink 1 | 8.9 | 3.8 | Medium | Medium |
| Example I-2 | First ink 2 | 7.3 | 2.4 | Medium | Medium |
| Example I-3 | First ink 3 | 5.5 | 1.6 | Good | Medium |
| Example I-4 | First ink 4 | 4.1 | 0.9 | Good | Good |
| Example I-5 | First ink 5 | 2.5 | 0.7 | Good | Good |
| Example I-6 | First ink 6 | 1.3 | 0.4 | Good | Good |
| Example I-7 | First ink 7 | 4.5 | 6.9 | Good | Good |
| Example I-8 | First ink 8 | 2.2 | 0.6 | Good | Good |
| Example I-9 | First ink 9 | 4.9 | 7.5 | Good | Good |
| Example I-10 | First ink 10 | 3.9 | 5.4 | Good | Good |
| Example I-11 | First ink 11 | 9.6 | 10.7 | Good | Good |
| Example I-12 | First ink 12 | 8.2 | 8.9 | Medium | Medium |
| Example I-13 | First ink 13 | 6. | 8 | Medium | Good |
| Example I-14 | First ink 14 | 3.1 | 5.2 | Good | Good |
| Example I-15 | First ink 15 | 2.8 | 4.6 | Good | Good |
| Example I-16 | First ink 16 | 2.2 | 4.2 | Good | Good |
| Example I-17 | First ink 17 | 1.9 | 3.5 | Good | Good |
| Example I-18 | First ink 18 | 9.7 | 11 | Good | Good |
| Example I-19 | First ink 19 | 3.2 | 0.6 | Medium | Medium |
| Example I-20 | First ink 20 | 3.8 | 0.5 | Good | Good |
| Example I-21 | First ink 21 | 4.1 | 0.7 | Good | Good |
| Example I-22 | First ink 22 | 5.1 | 0.8 | Medium | Medium |
| Example I-23 | First ink 23 | 4.7 | 0.8 | Good | Medium |
| Example I-24 | First ink 24 | 6.9 | 2.3 | Good | Good |
| Example I-25 | First ink 25 | 2.2 | 0.7 | Medium | Good |
| Example I-26 | First ink 26 | 2.8 | 0.6 | Good | Good |
| Example I-27 | First ink 27 | 2.5 | 0.7 | Medium | Medium |
| Example I-28 | First ink 28 | 2.4 | 0.7 | Good | Good |
| Example I-29 | First ink 29 | 2.3 | 0.5 | Good | Good |
| Example I-30 | First ink 30 | 2.7 | 0.7 | Good | Good |
| Example I-31 | First ink 31 | 2.5 | 0.6 | Good | Good |
| Example I-32 | First ink 32 | 2.4 | 0.5 | Good | Good |
| Example I-33 | First ink 33 | 2.6 | 0.7 | Good | Good |
| Example I-34 | First ink 34 | 2.2 | 0.6 | Good | Good |
| Example I-35 | First ink 35 | 2.5 | 0.7 | Good | Good |
| Example I-36 | First ink 36 | 2.3 | 0.5 | Good | Medium |
| Example I-37 | First ink 37 | 2.3 | 0.6 | Medium | Medium |
| Example I-38 | First ink 38 | 2.4 | 0.7 | Medium | Medium |
| Comparative Example I-1 | First ink 39 | 2.3 | 0.7 | Good | Good |
| Comparative Example I-2 | First ink 40 | 10.6 | 12.2 | Good | Good |
| Comparative Example I-3 | First ink 41 | 11.2 | 13.4 | Good | Good |
| Comparative Example I-4 | First ink 42 | 5.4 | 9.1 | Unavailable due to increased viscosity in ink preparation | |
| Comparative Example I-5 | First ink 43 | 9.5 | 10.6 | Bad | Bad |
| Comparative Example I-6 | First ink 44 | 0.7 | 0.2 | Good | Good |
| Comparative Example I-7 | First ink 45 | 10.6 | 8.1 | Good | Good |

TABLE 6-1-continued

| | First ink | G'(25° C.) × $10^7$ Pa | G'(25° C.) × $10^8$ Pa | Storage stability | Discharge reliability |
|---|---|---|---|---|---|
| Comparative Example I-8 | First ink 46 | 12.7 | 21.7 | Good | Good |
| Comparative Example I-9 | First ink 47 | 4.6 | 0.8 | Unavailable due to increased viscosity in ink preparation | |
| Comparative Example I-10 | First ink 48 | 2.6 | 0.7 | Bad | Bad |

TABLE 6-2

| Second ink | G'(25° C.) × $10^8$ Pa |
|---|---|
| Second ink1 | 7.4 |
| Second ink2 | 5.9 |
| Second ink3 | 2.2 |
| Second ink4 | 3.3 |
| Second ink5 | 5.4 |
| Second ink6 | 5.5 |
| Second ink7 | 5.7 |

Examples II-1 to II-44, Comparative Examples II-1 to II-10

<Method for Printing on Plastic Film>

For the purpose of preparing a solid image for evaluation, an inkjet printer obtained by remodeling IPSiO GXe 5500 model (manufactured by Ricoh Co., Ltd.) so as to reproduce a record at a recording speed equivalent to 30 mpm in one pass was used.

The two inkjet printers were charged with the first ink and the second ink respectively. The first ink was evenly applied on a corona-treated surface of PYLEN film P2111 (manufactured by TOYOBO CO., LTD.) having a thickness of 20 μm with an adhesion ratio of 0.5 mg/cm², and then the second ink was applied on the surface in an undried state at an adhesion ratio of 1.0 mg/cm² to form a solid image. This solid image was dried in a hot-air circulation thermostat set at 100 degrees C. for 1 minute to obtain a solid image.

<Image Density on Plastic Film>

The resulting solid image was subjected to colorimetry using X-Rite exact to evaluate an optical density (OD) of the image.

[Evaluation Criteria]

Good: OD was 2.4 or higher

Medium: OD was 2.0 or higher and lower than 2.4

Bad: OD was lower than 2.0

<Image Uniformity on Plastic Film>

For the resulting solid image, the image uniformity was visually evaluated.

[Evaluation Criteria]

Good: Uniform image without density unevenness

Medium: Image at a practically non-problematic level regardless of slight density unevenness Bad: Image at an impractical level with remarkable density unevenness <Adhesiveness to Plastic Film>

The resulting image was subjected to a grid peel test using a cloth adhesive tape (123 LW-50, manufactured by NICHIBAN CO., LTD.). The number of squares with remaining ink in 100 test squares was counted, and the adhesiveness was evaluated based on the following evaluation criteria.

[Evaluation Criteria]

Excellent: The number of squares with remaining ink was 100

Good: The number of squares with remaining ink was 98 or more and less than 100

Medium: The number of squares with remaining ink was 90 or more and less than 98

Bad: The number of squares with remaining ink was less than 90

<Method for Printing on Fabric>

A polyester T-shirt manufactured by TOMS CO., LTD. was set on Ri100 (manufactured by Ricoh Co., Ltd.). The inkjet printer was charged with the first ink and the second ink. The first ink was evenly applied on the T-shirt with an adhesion ratio of 1.0 mg/cm², and then the second ink was applied on the T-shirt at an adhesion ratio of 2.0 mg/cm² to form a solid image. The T-shirt was dried by a heat press set at 160 degrees C. for 1 minute to obtain a solid image.

<Image Density in Fabric>

The resulting solid image was subjected to colorimetry using X-Rite eXact to evaluate an OD of the image.

[Evaluation Criteria]

Excellent: OD was 1.3 or higher

Good: OD was 1.2 or higher and lower than 1.3

Medium: OD was 1.1 or higher and lower than 1.2

Bad: OD was lower than 1.1

<Image Friction Fastness Property on Fabric>

In a friction fastness test (dry friction) using a color fastness rubbing tester according to JIS (Japanese Industrial Standard) L0849, the OD of the image transferred to cotton fabric was colorimetrically measured to evaluate an image friction fatness property based on the following evaluation criteria.

[Evaluation Criteria]

Excellent: OD of the image transferred to cotton fabric was lower than 0.15

Good: OD of the image transferred to cotton fabric was 0.15 or higher and lower than 0.20

Medium: OD of the image transferred to cotton fabric was 0.20 or higher and lower than 0.25

Bad: OD of the image transferred to cotton fabric was 0.25 or higher and lower than 0.30

<Image Washing Fastness Property on Fabric>

In a washing fastness test according to AATCC 612A, the image washing fastness property was evaluated based on the following evaluation criteria.

[Evaluation Criteria]

Excellent: Image at grade 4.5 or higher

Good: Image at grade 4.0

Medium: Image at grade 3.5

Bad: Image at grade 3.0 or lower

TABLE 7

| | | | Plastic film | | | Textile media | |
| | | | | | | friction | washing |
| | First ink | Second ink | Image density | Image uniformity | Adhesiveness | Image density | fastness property | fastness propertiy |
|---|---|---|---|---|---|---|---|---|
| Example II-1 | First ink 1 | Second ink 3 | Good | Good | Good | Good | Good | Good |
| Example II-2 | First ink 2 | Second ink 3 | Good | Good | Good | Good | Good | Good |
| Example II-3 | First ink 3 | Second ink 3 | Good | Good | Excellent | Good | Excellent | Good |
| Example II-4 | First ink 4 | Second ink 3 | Good | Good | Excellent | Good | Excellent | Excellent |
| Example II-5 | First ink 5 | Second ink 3 | Good | Good | Excellent | Good | Excellent | Excellent |
| Example II-6 | First ink 6 | Second ink 3 | Good | Good | Excellent | Good | Excellent | Excellent |
| Example II-7 | First ink 7 | Second ink 3 | Good | Good | Excellent | Good | Excellent | Good |
| Example II-8 | First ink 8 | Second ink 3 | Good | Good | Excellent | Good | Excellent | Excellent |
| Example II-9 | First ink 9 | Second ink 3 | Good | Good | Excellent | Good | Excellent | Good |
| Example II-10 | First ink 10 | Second ink 3 | Good | Good | Excellent | Good | Excellent | Good |
| Example II-11 | First ink 11 | Second ink 3 | Good | Good | Good | Good | Good | Good |
| Example II-12 | First ink 12 | Second ink 3 | Good | Good | Good | Good | Good | Good |
| Example II-13 | First ink 13 | Second ink 3 | Good | Good | Good | Good | Good | Good |
| Example II-14 | First ink 14 | Second ink 3 | Good | Good | Excellent | Good | Excellent | Good |
| Example II-15 | First ink 15 | Second ink 3 | Good | Good | Excellent | Good | Excellent | Good |
| Example II-16 | First ink 16 | Second ink 3 | Good | Good | Excellent | Good | Excellent | Good |
| Example II-17 | First ink 17 | Second ink 3 | Good | Good | Excellent | Good | Excellent | Good |
| Example II-18 | First ink 18 | Second ink 3 | Good | Good | Good | Good | Good | Good |
| Example II-19 | First ink 19 | Second ink 3 | Good | Good | Good | Good | Good | Excellent |
| Example II-20 | First ink 20 | Second ink 3 | Good | Good | Excellent | Good | Excellent | Excellent |
| Example II-21 | First ink 21 | Second ink 3 | Good | Good | Excellent | Good | Excellent | Excellent |
| Example II-22 | First ink 22 | Second ink 3 | Good | Good | Excellent | Good | Excellent | Excellent |
| Example II-23 | First ink 23 | Second ink 3 | Good | Good | Excellent | Good | Excellent | Excellent |
| Example II-24 | First ink 24 | Second ink 3 | Good | Good | Good | Good | Good | Good |
| Example II-25 | First ink 25 | Second ink 3 | Good | Good | Excellent | Good | Excellent | Excellent |
| Example II-26 | First ink 26 | Second ink 3 | Good | Medium | Excellent | Good | Excellent | Excellent |
| Example II-27 | First ink 27 | Second ink 3 | Medium | Medium | Excellent | Medium | Excellent | Excellent |
| Example II-28 | First ink 28 | Second ink 3 | Good | Good | Excellent | Good | Excellent | Excellent |
| Example II-29 | First ink 29 | Second ink 3 | Good | Good | Excellent | Good | Excellent | Excellent |
| Example II-30 | First ink 30 | Second ink 3 | Medium | Medium | Excellent | Medium | Excellent | Excellent |
| Example II-31 | First ink 31 | Second ink 3 | Medium | Medium | Excellent | Medium | Excellent | Excellent |
| Example II-32 | First ink 32 | Second ink 3 | Good | Medium | Excellent | Good | Excellent | Excellent |
| Example II-33 | First ink 33 | Second ink 3 | Good | Good | Excellent | Good | Excellent | Excellent |
| Example II-34 | First ink 34 | Second ink 3 | Good | Good | Excellent | Good | Excellent | Excellent |
| Example II-35 | First ink 35 | Second ink 3 | Good | Good | Excellent | Good | Excellent | Good |
| Example II-36 | First ink 36 | Second ink 3 | Good | Good | Good | Good | Good | Good |
| Example II-37 | First ink 37 | Second ink 3 | Good | Medium | Good | Good | Good | Good |
| Example II-38 | First ink 38 | Second ink 3 | Medium | Medium | Good | Medium | Good | Good |
| Example II-39 | First ink 5 | Second ink1 | Good | Good | Good | Good | Good | Good |
| Example II-40 | First ink 5 | Second ink2 | Good | Good | Excellent | Good | Excellent | Good |
| Example II-41 | First ink 5 | Second ink4 | Good | Good | Good | Good | Good | Good |
| Example II-42 | First ink 5 | Second ink5 | Good | Good | Excellent | Good | Excellent | Good |
| Example II-43 | First ink 5 | Second ink6 | Good | Medium | Excellent | Good | Excellent | Good |
| Example II-44 | First ink 5 | Second ink7 | Medium | Medium | Excellent | Medium | Excellent | Good |
| Comparative Example II-1 | First ink 39 | Second ink 3 | Bad | Bad | Good | Bad | Good | Good |
| Comparative Example II-2 | First ink 40 | Second ink 3 | Good | Good | Medium | Good | Medium | Bad |
| Comparative Example II-3 | First ink 41 | Second ink 3 | Good | Good | Bad | Good | Bad | Bad |
| Comparative Example II-4 | First ink 42 | Second ink 3 | Unevaluable due to increased viscosity in ink preparation | | | | | |
| Comparative Example II-5 | First ink 43 | Second ink 3 | Good | Good | Medium | Good | Medium | Medium |
| Comparative Example II-6 | First ink 44 | Second ink 3 | Good | Good | Medium | Good | Medium | Medium |
| Comparative Example II-7 | First ink 45 | Second ink 3 | Good | Good | Medium | Good | Medium | Medium |
| Comparative Example II-8 | First ink 46 | Second ink 3 | Good | Good | Bad | Good | Bad | Bad |
| Comparative Example II-9 | First ink 47 | Second ink 3 | Unevaluable due to increased viscosity in ink preparation | | | | | |
| Comparative Example II-10 | First ink 48 | Second ink 3 | Good | Good | Excellent | Good | Excellent | Excellent |

The invention claimed is:

1. An inkjet ink set comprising:
a first ink comprising:
a resin containing a resin (1) having a structural unit represented by the following general formula (1):

$$-(CH_2CH_2O)_n- \quad \text{general formula (1)}$$

where n represents an integer of 5 to 100; and
a polyvalent metal ion,
wherein a dried film obtained by drying the resin has a storage modulus of $1.0=10^8$ Pa or lower in a dynamic viscoelasticity measurement at 25 degrees C.; and
a second ink containing a colorant,
wherein a dried film obtained by drying the second ink has a storage modulus of $7.0 \times 10^8$ Pa or lower in the dynamic viscoelasticity measurement at 25 degrees C.

2. The inkjet ink set according to claim 1, wherein a content of the structural unit represented by the general formula (1) in the resin (1) is 5% by mass to 60% by mass.

3. The inkjet ink set according to claim 1, wherein the dried film obtained by drying the resin has a storage modulus of $3.0 \times 10^8$ Pa or lower in a dynamic viscoelasticity measurement at −20 degrees C.

4. The inkjet ink set according to claim 1, wherein the resin (1) having the structural unit represented by the general formula (1) is a polyurethane resin.

5. The inkjet ink set according to claim 1, further comprising a silicone surfactant.

6. The inkjet ink set according to claim 1, wherein the second ink further contains a polyurethane resin.

7. An inkjet recording method, comprising:
discharging said first inkjet ink of said inkjet ink set according to claim 1 from a nozzle of a recording head;
applying said first inkjet ink onto a recording medium;
discharging said second inkjet ink of said inkjet ink set according to claim 1 from a nozzle of a recording head; and
applying said second inkjet ink onto said recording medium.

8. The inkjet recording method according to claim 7, wherein the recording medium comprises at least one of a fabric or a plastic film.

* * * * *